United States Patent [19]
Morimoto

[11] Patent Number: 5,898,588
[45] Date of Patent: Apr. 27, 1999

[54] METHOD AND APPARATUS FOR CONTROLLING SUBSTRATE PROCESSING APPARATUS

[75] Inventor: Toru Morimoto, Kyoto, Japan

[73] Assignee: Dainippon Screen Mfg. Co., Japan

[21] Appl. No.: 08/729,588

[22] Filed: Oct. 11, 1996

[30] Foreign Application Priority Data

Oct. 27, 1995 [JP] Japan .................................... 7-303458
Oct. 27, 1995 [JP] Japan .................................... 7-303459

[51] Int. Cl.⁶ .............................. G06F 19/00; G06G 7/64; G06G 7/66
[52] U.S. Cl. .................................. 364/468.15; 364/468.15; 364/468.17; 364/183; 364/474.11
[58] Field of Search .............................. 364/183, 468.15, 364/468.17, 468.01, 468.02, 184, 187, 185, 186, 474.11, 474.16; 414/217, 331, 416; 371/20.1, 20.5, 20.6, 30; 395/183.19, 185.01, 185.09

[56] References Cited

U.S. PATENT DOCUMENTS

| | | | |
|---|---|---|---|
| 4,806,057 | 2/1989 | Cay et al. ................................ | 414/225 |
| 4,818,327 | 4/1989 | Davis et al. ............................. | 156/345 |
| 4,911,597 | 3/1990 | Maydan et al. ......................... | 414/217 |
| 5,166,603 | 11/1992 | Hoshi .................................... | 324/158 |
| 5,171,393 | 12/1992 | Moffat .................................... | 156/345 |
| 5,295,777 | 3/1994 | Hodos .................................... | 414/217 |
| 5,387,067 | 2/1995 | Grunes ................................... | 414/217 |
| 5,399,531 | 3/1995 | Wu ......................................... | 437/205 |
| 5,474,641 | 12/1995 | Otasuki et al. ......................... | 156/345 |
| 5,486,080 | 1/1996 | Sieradzki ................................ | 414/217 |
| 5,529,630 | 6/1996 | Imahashi et al. ....................... | 118/665 |
| 5,540,098 | 7/1996 | Ohsawa ................................... | 73/629 |
| 5,556,248 | 9/1996 | Grunes ................................... | 414/416 |
| 5,563,095 | 10/1996 | Frey ........................................ | 437/141 |
| 5,621,982 | 4/1997 | Yamashita et al. ...................... | 34/203 |
| 5,628,604 | 5/1997 | Murata et al. .......................... | 414/225 |

FOREIGN PATENT DOCUMENTS 4-305918  10/1992  Japan.
7-201950  8/1995  Japan.

*Primary Examiner*—Reba I. Elmore
*Assistant Examiner*—Ramesh Patel
*Attorney, Agent, or Firm*—Ostrolenk, Faber, Gerb & Soffen

[57] ABSTRACT

A method and apparatus for successively conveying substrates between a plurality of processing units, the processing units processing the substrates as required where, when one of the plurality of processing units raises an alarm to inform the user of the occurrence of some abnormality, the processing and conveyance of the substrates located on the transport path in and after either an alarm-raising processing unit or a predetermined skip-mode subject unit are completed; however the conveyance is suspended for the substrates located on the transport path before either the alarm-raising processing unit or the predetermined skip-mode subject unit.

16 Claims, 11 Drawing Sheets

Fig. 6

IN CASE THAT ALARM ACTIVATES SKIP MODE

| CYCLES | IND | HP1 | CP1 | SC | HP2 | CP2 | IND |
|---|---|---|---|---|---|---|---|
| ... | ... | ... | ... | ... | ... | ... | ... |
| m | n | n−1 | n−2 | n−3 | n−4 | n−5 | n−6 |
| m+1 | n+1 | n | n−1 | n−2 | n−3 | n−4 | n−5 |
| m+2 | n+2 | n+1 | n | n−1 | n−2 | n−3 | n−4 |
| m+3 | n+3 | n+2 | n+1 | n | n−1 | n−2 | n−3 |
| m+4 | x | n+2 | n+1 | x | x | n−1 | n−2 |
| m+5 | x | n+2 | n+1 | x | x | x | n−1 |
| m+6 | x | n+2 | n+1 | x | x | x | n |
| m+7 | n+3 | n+3 | n+2 | n+1 | x | x | x |
| m+8 | n+4 | n+4 | n+3 | n+2 | n+1 | n+1 | x |
| m+9 | n+5 | n+5 | n+4 | n+3 | n+2 | n+2 | x |
| m+10 | n+6 | n+6 | n+5 | n+4 | n+3 | n+3 | x |
| m+11 | n+7 | n+7 | n+6 | n+5 | n+4 | n+4 | n+1 |
| ... | ... | ... | ... | ... | ... | ... | ... |

• An alarm is given by SC in cycle m+3 and canceled in cycle m+7.

Fig. 9

IN CASE THAT CONVEYANCE WAITING TIME ACTIVATES SKIP MODE

| CYCLES | IND | HP1 | CP1 | SC | HP2 | CP2 | IND |
|--------|-----|-----|-----|----|----|-----|-----|
| 1  | 1 | x | x | x | x | x | x |
| 2  | 2 | 1 | x | x | x | x | x |
| 3  | 3 | 2 | 1 | x | x | x | x |
| 4  | 4 | 3 | 2 | x | x | x | x |
| 5  | 5 | 4 | 3 | 1 | x | x | x |
| 6  | 5 | 4 | 3 | 2 | x | x | x |
| 7  | 5 | 4 | 3 | 2 | x | x | x |
| 8  | 6 | 5 | 4 | 2 | 1 | x | x |
| 9  | 6 | 5 | 4 | 3 | x | x | x |
| 10 | 6 | 5 | 4 | 3 | 2 | x | 1 |
| 11 | 7 | 6 | 5 | 3 | x | x | x |
| 12 | 7 | 6 | 5 | 4 | x | 2 | x |
| 13 | 7 | 6 | 5 | 4 | 3 | x | x |
| 14 | 8 | 7 | 6 | 4 | x | x | 2 |
| 15 | 8 | 7 | 6 | 5 | x | 3 | x |
| 16 | 8 | 7 | 6 | 5 | 4 | x | x |
| 17 | 9 | 8 | 7 | 6 | 5 | 4 | x |
| ...... | ...... | ...... | ...... | ...... | ...... | ...... | ...... |

· Because SC has the long processing time, HP2 and the subsequent processing units perform the skip mode operation.

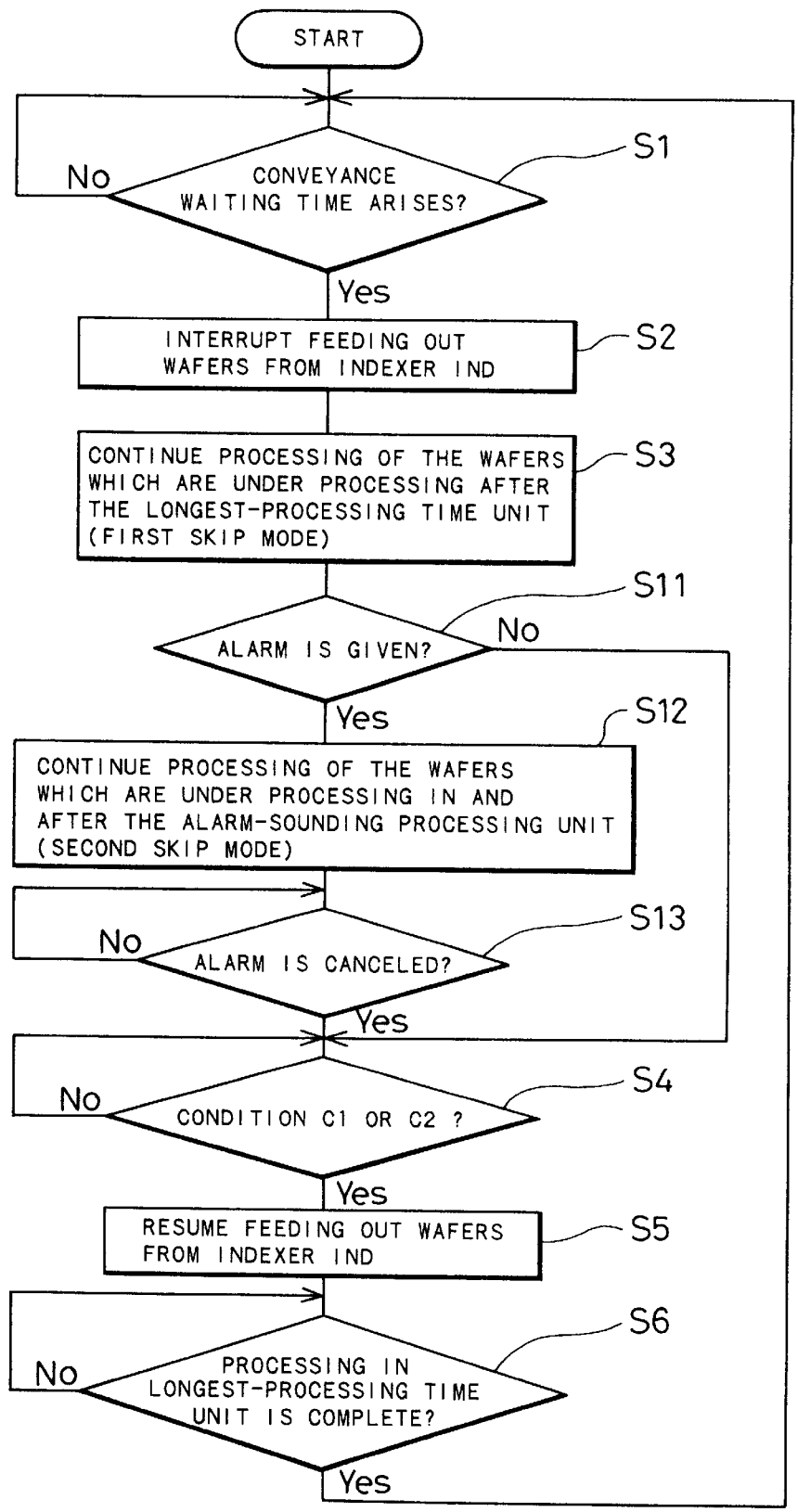
Fig. 10  CONTROL ROUTINE TRIGGERED BY CONVEYANCE WAITING TIME AND AN ALARM

METHOD AND APPARATUS FOR CONTROLLING SUBSTRATE PROCESSING APPARATUS

BACKGROUND OF THE INVENTION

1. Field of the Invention

The present invention relates to a method of and an apparatus for controlling a substrate processing apparatus, which successively conveys substrates, such as semiconductor wafers and liquid-crystal display substrates, to a plurality of processing units via a preset transport path and processes the conveyed substrates.

2. Description of the Related Art

In a conventional substrate processing apparatus, substrates are successively conveyed to the respective processing units by a conveyance robot and subsequently processed in the respective processing units according to a preset order of transporting the substrates to the processing units (preset transport path) and a predetermined processing recipe for defining the processing conditions in the respective processing units. In the course of processing the substrates, there are some situations in which an alarm is given to inform the user of the occurrence of some abnormality in one of the plurality of processing units. When the alarm is raised, the conventional system immediately stops the conveyance of the substrates and suspends the processing thereof.

According to some processing programs, the longest time period required for the processing of substrates in a particular processing unit (hereinafter referred to as the 'longest-processing time unit') is longer than the time period required for one cycle of conveyance by the conveyance robot. The time required for one cycle of conveyance is the total time period required for transferring the substrates in the processing units to subsequent, corresponding processing units. In such a case, a delay occurs before the conveyance robot transfers the next substrate to the longest-processing time unit (hereinafter referred to as the conveyance waiting time). The processing in the longest-processing time unit thus becomes the rate-determining stage in the system and restricts the operation rate of the entire substrate processing apparatus. When a conveyance waiting time arises, the conventional system stops the conveyance of the substrates, and suspends the processing thereof.

When the processing of the substrates is interrupted, the substrates currently being processed may be adversely may be affected. For example, when the process of heating treating substrates is interrupted, the heat treatment time would be longer than planned, thereby causing over-baking (i.e., excessive heat treatment).

SUMMARY OF THE INVENTION

Accordingly, an object of the present invention is to prevent the adverse effects imposed on substrates being processed when a processing unit causes an alarm to be raised.

Another object of the present invention is to prevent the adverse effects imposed on the substrates being processed when a conveyance waiting time arises.

In order to attain at least some of the above objects, the present invention is directed to a method of controlling a substrate processing apparatus which successive causes the successive conveyance of substrates to a plurality of processing units via a preset transport path and causes the processing of the substrates thus conveyed. The method comprises the step of: executing a control sequence in a skip mode when one of the plurality of processing units causes an alarm to be raised which indicates the occurrence of an abnormality. Control in the skip mode continues and completes the processing and conveyance of each substrate already on the transport path of the processing units located in and after the processing unit for which an alarm has been raised and suspends the conveyance of each substrate in the transport path of the processing units located before the processing unit for which the alarm has been raised.

The method of the present invention enables the processing to be completed for the substrates located in and after the processing unit for which an alarm has been raised, thereby preventing at least these substrates from being adversely affected.

In another aspect of the present inventions the method comprises the steps of: selecting at least one of the plurality of processing units as a skip-mode subject unit; and executing a control sequence in a skip mode when one of the plurality of processing units causes an alarm to be raised which indicates the occurrence of an abnormality, where the skip mode continues and completes the processing and conveyance of each substrate on the transport path in and after the skip-mode subject unit while suspending the conveyance for each substrate on the transport path before the skip-mode subject unit.

This method enables the processing to be completed for the substrates located in and after the skip-mode subject unit, thereby preventing at least these substrates from being adversely affected.

In a preferred embodiment, the method further comprises the steps of: selecting one of a skip mode and a processing complete mode, where the processing complete mode continues the processing and conveyance of substrates until the completion of the transport path for each substrate under processing that is located on the transport path is obtained prior to suspending operation of the substrate processing apparatus; and carrying out the selected mode when the alarm is raised.

This feature enables either the skip mode or the processing complete mode to be selectively carried out according to the transport path, thereby improving the efficiency of the substrate processing apparatus.

The skip-mode subject unit comprises a coating unit for coating a layer of chemical material on a substrate. This feature prevents at least the substrates which are coated with a chemical layer in the coating unit from being adversely affected.

In still another aspect of the present invention, the method comprises the step of: executing the control in a first skip mode when a waiting time arises before transferring a substrate to a longest-processing time unit which has the longest processing time among the plurality of processing units, where the first skip mode continues the processing and conveyance of substrates until the completion of the preset transport path for each substrate existing on the transport path after the longest-processing time unit is obtained while suspending the conveyance for each substrate existing on the transport path before the longest-processing time unit.

This method enables the processing to be completed for the substrates located after the longest-processing time unit, thereby preventing at least these substrates from being adversely affected.

In a preferred embodiment of the present invention, the method further comprises the step of: executing a control sequence in a second skip mode when one of the plurality of processing units raises an alarm to indicate the occurrence of an abnormality while the first skip mode is being executed. The second skip mode continues the processing and conveyance of substrates until the completion of the preset transport path for each substrate existing on the transport path in and after the alarm-raising processing unit is obtained, while suspending the conveyance for each substrate existing in the transport path before the alarm-raising processing unit.

This method enables the processing to be completed for the substrates located in and after the alarm-raising processing unit, thereby preventing at least these substrates from being adversely affected.

In still another embodiment of the present invention, the method further comprises the steps of: selecting at least one of the plurality of processing units as a skip-mode subject unit; and executing a control sequence in a second skip mode when one of the plurality of processing units raises an alarm to indicate the occurrence of abnormality while the first skip mode is being executed. The second skip mode continues the processing and conveyance of substrates until the completion of the preset transport path for each substrate existing on the transport path in and after the skip-mode subject unit is obtained, while suspending the conveyance for each substrate existing in the transport path before the skip-mode subject unit.

The present invention is further directed to a controlling apparatus for controlling a substrate processing apparatus which successively conveys substrates via a preset transport path and processes the substrates thus conveyed. The controlling apparatus comprises: a plurality of processing units; and system for executing a control sequence in a skip mode when one of the plurality of processing units raises an alarm to indicate the occurrence of an abnormality, where the skip mode continues the processing and conveyance until completion of the preset transport path for each substrate existing on the transport path in and after the alarm-raising processing unit is obtained, while suspending the conveyance for each substrate existing in the transport path before the alarm-raising processing unit.

In another aspect of the present invention, the controlling apparatus comprises: a system for selecting at least one of the plurality of processing units as a skip-mode subject unit; and a system for executing a control sequence in a skip mode when one of the plurality of an processing units raises an alarm to indicate the occurrence of an abnormality, where the skip mode continues the processing and conveyance of substrates until the completion of the preset transport path for each substrate existing on the transport path in and after the skip-mode subject unit is obtained, while suspending the conveyance for each substrate existing on the transport path before the skip-mode subject unit.

In still another aspect of the present invention, the controlling apparatus comprises: a system for executing a control sequence in a first skip mode when a waiting time arises before transferring a substrate to a longest-processing time unit which has a longest processing time among the plurality of processing units. The first skip mode continues the processing and conveyance of substrates until the completion of the preset transport path for each substrate existing on the transport path after the longest-processing time unit is obtained, while suspending the conveyance for each substrate existing on the transport path before the longest-processing time unit.

These and other objects, features, aspects and advantages of the present invention will become more apparent from the following detailed description of the preferred embodiments with the accompanying drawings.

BRIEF DESCRIPTION OF THE DRAWINGS

FIG. 6 is a table showing a flow of wafers when an alarm switches the processing mode to the skip mode in accordance with the present invention;

FIG. 9 is a table showing a flow of wafers when the presence of a conveyance waiting time activates the first skip mode;

FIG. 10 is a flowchart showing a control routine executed in a third embodiment of the present invention.

DESCRIPTION OF THE PREFERRED EMBODIMENT

A. First Embodiment

Figure 1:
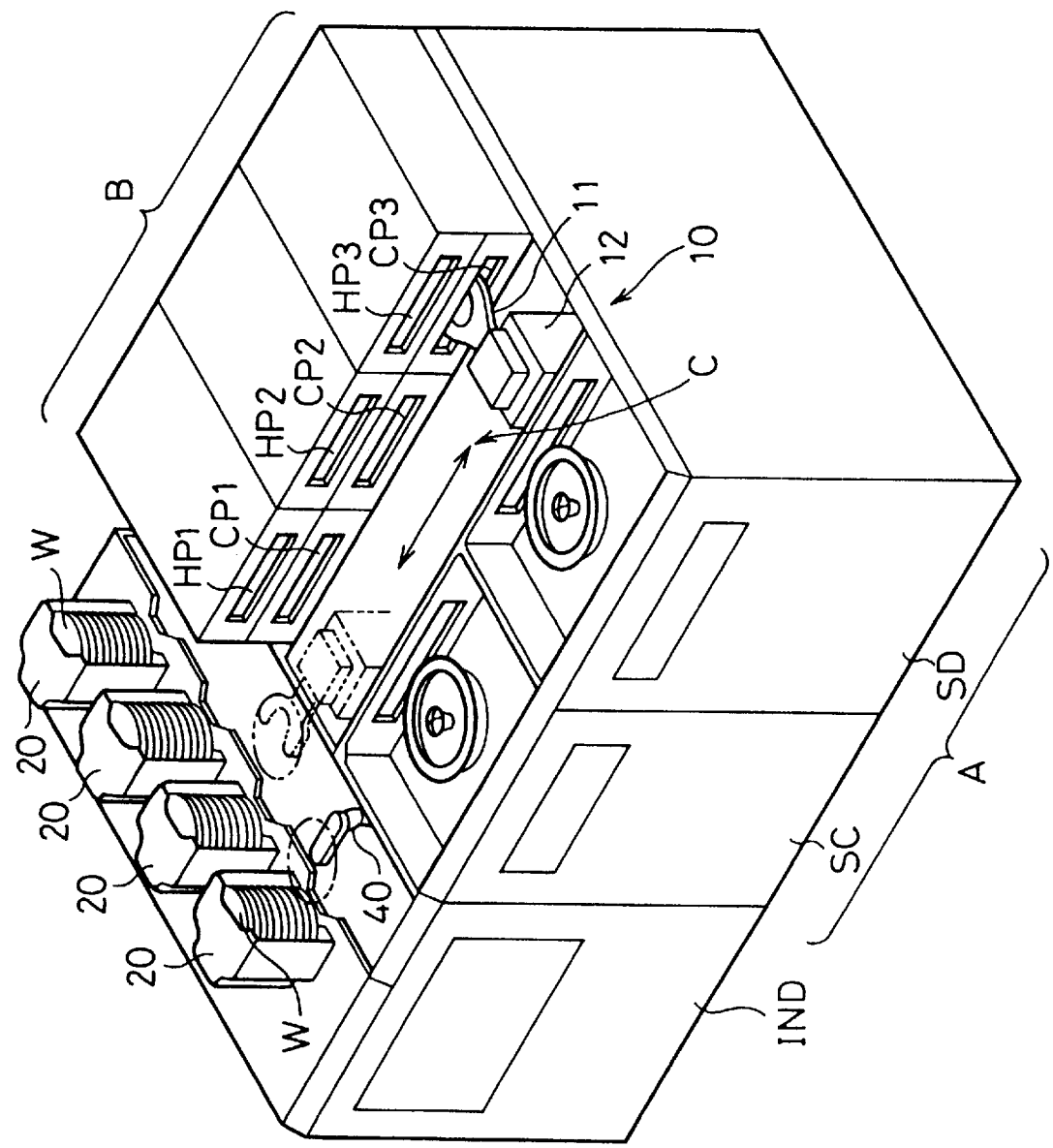
FIG. 1 is a perspective view illustrating a semiconductor wafer processing apparatus embodying the present invention.

FIG. 1 is a perspective view illustrating a semiconductor wafer processing apparatus embodying the present invention. The semiconductor wafer processing apparatus is a spinner including a plurality of processing units for carrying out a series of processes (i.e., in this embodiment, coating process, a developing process, a heating process, and a cooling process) to treat semiconductor wafers W. A first group of processing units A, arranged in a front row include a spin coater SC for carrying out a film coating process and a spin developer SD for carrying out a film developing process.

A second group of processing units B are arranged in a rear row opposite the first group of processing units A. The second group of processing units B include hot plates HP1–HP3 and cool plates CP1–CP3 for heat treating the wafers W.

The apparatus further includes a conveyance area C extending along the first group of processing units A and interposed between the groups A and B. A conveyance robot 10 is arranged to be freely movable in the conveyance area C. The conveyance robot 10 includes a movable body 12 having a support member 11 with a pair of arms for respectively supporting a semiconductor wafer W (only one arm is observed in the drawing of FIG. 1). The upper and the lower arms of the support member 11 are driven by an arm driving mechanism (not shown) and used to replace semiconductor wafers in each processing unit. While one of the arms receives a processed semiconductor wafer from a specific processing unit, the other arm disposes a non-processed semiconductor wafer conveyed from another processing unit into the specific processing unit. Although not illustrated, a three-dimensional driving mechanism is linked with the movable body 12 of the conveyance robot 10. The driving mechanism shifts the movable body 12 to a position in front of each processing unit and enables the movable body 12 to transfer the semiconductor wafers W to and from the processing unit.

An indexer IND for removing and inserting the semiconductor wafers W out of and into cassettes 20 is disposed on one end of the semiconductor wafer processing apparatus. A loading robot 40 mounted on the indexer IND takes a non-processed semiconductor wafer W out of the cassette 20 and transfers the non-processed semiconductor wafer W to the conveyance robot 10. The loading robot 40 also receives a processed semiconductor wafer W, which has undergone all of the processes, and returns the semiconductor wafer W to the cassette 20. Although not illustrated in FIG. 1, an interface unit for receiving and transferring the semiconductor wafers W from and to another processing apparatus (for example, an exposure apparatus, such as a stepper) is disposed on the end of the apparatus opposite the indexer IND. Transfer of the semiconductor wafers W between the semiconductor wafer processing apparatus of the embodiment and another processing apparatus is carried out by a transfer robot (not shown) mounted on the interface unit in cooperation with the conveyance robot 10.

Figure 2:
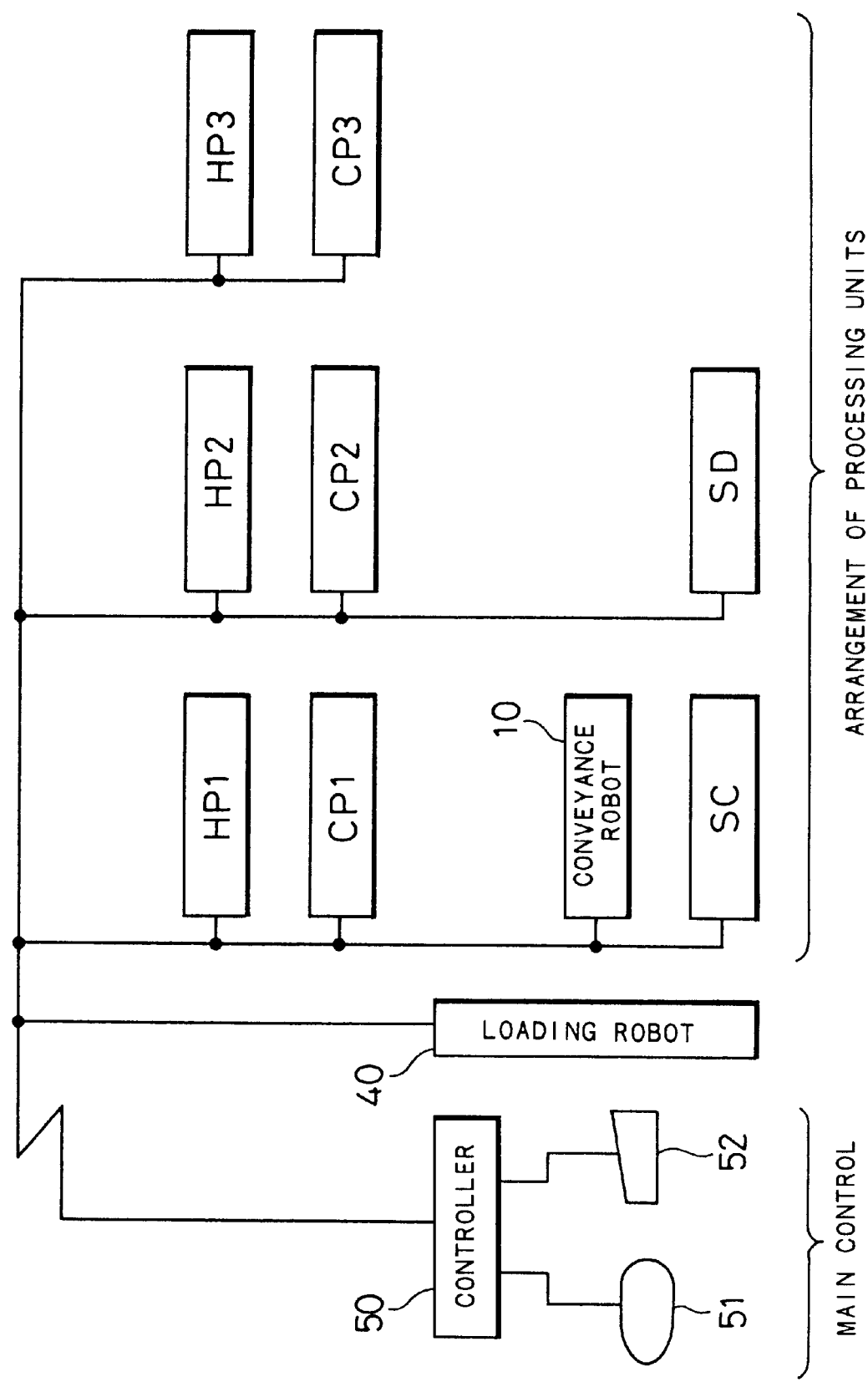
FIG. 2 is a block diagram illustrating the electrical structure of the semiconductor wafer processing apparatus.

FIG. 2 is a block diagram illustrating the electrical structure of the semiconductor wafer processing apparatus of FIG. 1. Referring to FIG. 2, a controller 50 is constructed as an arithmetic and logic unit including a central processing unit (CPU) and main memories (RAM and ROM). A display 51 and a keyboard 52 are connected to the controller 50. The controller 50 controls the operation of the conveyance robot 10, the loading robot 40 (the robot on the indexer IND), and the respective processing units SC, SD, HP1–HP3, and CP1–CP3 according to a predetermined processing program. The controller 50 also includes an: alarm detection circuit for detecting an alarm; a conveyance waiting time detection circuit for detecting the occurrence of a conveyance waiting time; and a skip mode execution circuit for executing various skip modes to be described later.

Computer program codes which enable a computer to implement the variety of functions of the controller 50 (applications programs) are transferred from a computer readable storage medium (i.e., a transportable storage medium), such as a floppy disk or CD-ROM, to the main memory of the controller 50 or the external storage device thereof.

Figure 3:
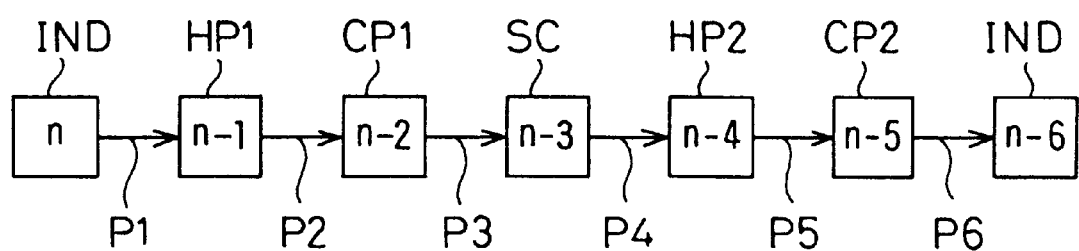
FIG. 3 shows an example of a transport path for semiconductor wafers W in the semiconductor wafer processing apparatus in a first embodiment of the present invention.

FIG. 3 shows an example of a transport path for semiconductor wafers in the semiconductor wafer processing apparatus in a first embodiment of the present invention. In this example, the semiconductor wafers are conveyed serially from the indexer IND to: the first hot plate HP1, the first cool plate CP1, the spin coater SC, the second hot plate HP2, and the second cool plate CP2 for processing in the respective processing units. Finally, the wafers are returned to the cassette 20 on the indexer IND. In the drawing of FIG. 3, the blocks represent the respective processing units, and the symbols n to (n−6) (written in the respective blocks) denote the ordinal numbers of semiconductor wafers which are under processing in the respective processing units. As shown in FIG. 3, the (n−5)-th wafer is being cooled in the cool plate CP2, while the (n−4)-th wafer is being heated in the hot plate HP2. The subsequent wafers are being processed in the respective processing units in a similar manner. The n-th wafer written in the position of the indexer IND has been taken out of the cassette 20 by the loading robot 40 and is temporarily stored on a pin (not shown) to be transferred to the conveyance robot 10.

Paths P1 through P6 located between the respective neighboring processing units represent the transport operations performed by the conveyance robot 10. In this embodiment, the wafers located somewhere between the left-end path P1 and the right-end path P6 in FIG. 3 are referred to as 'wafers under processing'. More particularly the wafers that are being processed in the respective processing units HP1, CP1, SC, HP2, and CP2 are the wafers under processing. However, the wafers stored on the pins of the indexer IND (i.e., the n-th and the (n−6)-th wafers in the indexer IND) are not wafers under processing.

The transport path shown in FIG. 3 is registered in a processing program previously set by the user. The processing program represents data for defining the transport path as well as the processing conditions in the respective processing units. The controller 50 controls the conveyance robot 10, the loading robot 40, and the respective processing units according to the processing program. While the semiconductor wafer processing apparatus works under normal conditions, the wafers are successively processed according to the transport path shown in FIG. 3.

When one or more processing units detect some abnormality, the processing unit raises an alarm and informs the controller 50 of the occurrence of an abnormality. For example, the alarm is raised when the volume of a chemical solution in the spin coater SC is insufficient or when an abnormal temperature is detected in the hot plate HP1 or HP2. The controller 50 then raises an alarm to inform the user of the occurrence of an abnormality and executes a required control sequence in response to the alarm.

Figure 4:
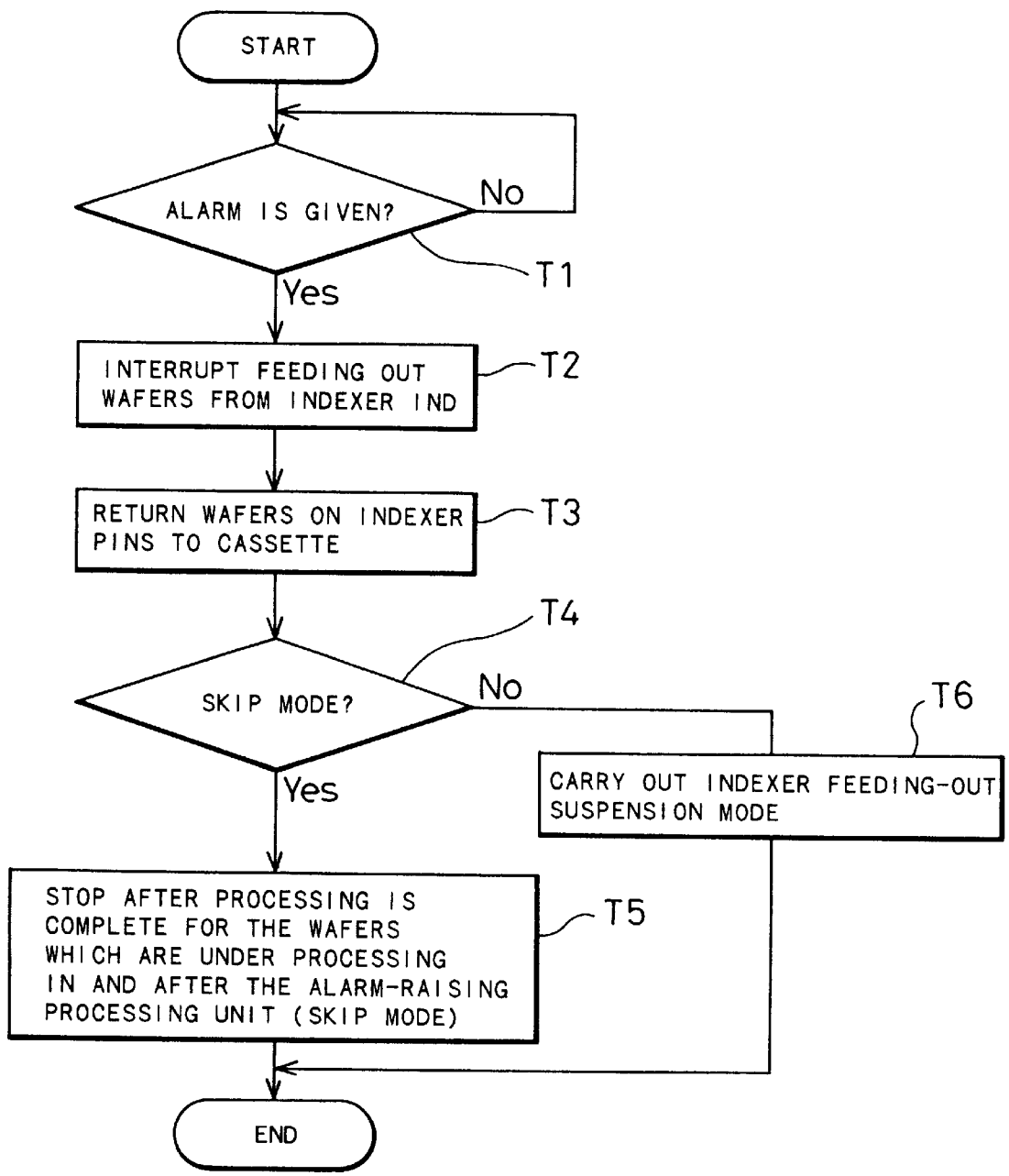
FIG. 4 is a flowchart showing a control routine triggered by an alarm in accordance with the present invention.

FIG. 4 is a flowchart showing a control routine executed by the controller 50 which is triggered by an alarm. At step T1, the controller 50 continuously monitors whether or not an alarm is given. If an alarm is raised, the controller 50 interrupts the operation of feeding out wafers from the indexer IND at step T2 and returns the wafers stored on the pins of the indexer IND to the cassette 20 at step T3. The operation of step T3 may, however, be omitted if it is not required.

At step T4, the controller 50 determines whether or not a skip mode is available for the apparatus. The user can specify in advance (using the keyboard 52) whether or not the skip mode is to be carried out. When the skip mode is available, the program proceeds to step T5, which provides that the control sequence in the skip mode is carried out. When the skip mode is not available, the program proceeds to step T6, which provides that a control sequence for an indexer feeding-out suspension mode is carried out.

The control sequence in the indexer feeding-out suspension mode continues the processing and conveyance of all the wafers under processing at the time at which an alarm is raised and returns all such wafers to the indexer IND. When the alarm is raised in the system of FIG. 3, the control sequence in the indexer feeding-out suspension mode continues processing the five wafers, i.e., the (n−5)-th to (n−1)-st wafers and conveys the five wafers to the indexer IND. In the indexer feeding-out suspension mode, wafer processing and conveyance are continued until no wafer under processing is present in the semiconductor wafer processing apparatus. This effectively prevents the wafers from being left in any of the midcourse of processor units without further action. In order to execute the control sequence in the indexer feeding-out suspension mode, an alarm must be raised such that sufficient margin exists to enable the processing of all the wafers located in the respective processing units to be completed. Thus, the alarm as specified does not require that the processing unit which has raised the alarm be stopped immediately, but informs the user of an abnormality within a margin that enables at least a predetermined number of wafers (for example, 5 wafers) to be processed. The indexer feeding-out suspension mode corresponds to the processing complete mode of the present invention.

Figure 5:
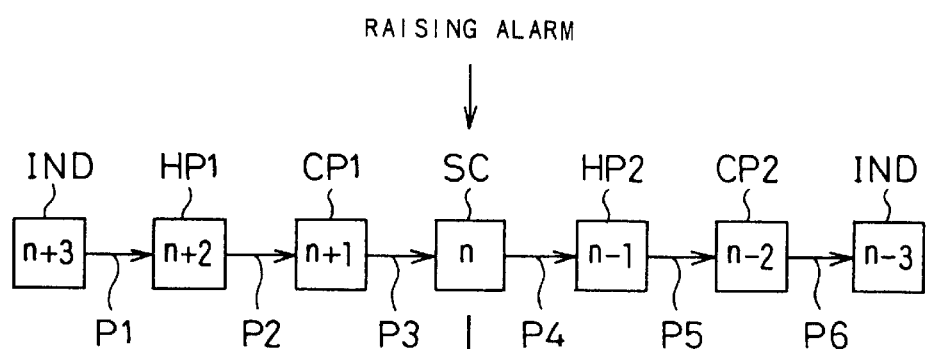
FIG. 5 shows a specific procedure in the skip mode according to the present invention.

In the skip mode at step T5 in the flowchart of FIG. 4, the controller 50 continues the processing and conveyance of the wafers under processing that are located on the transport path in and after the processing unit raising the alarm (hereinafter referred to as the 'alarm-raising processing unit'), and stops the operation of the semiconductor wafer processing apparatus when all such wafers are returned into the cassette 20 of the indexer IND. As for the wafers under processing that are located on the transport path before the alarm-raising processing unit, the controller 50 stops the conveyance after the completion of the processing in the respective processing units and holds such wafers at respective stand-by positions in the respective processing units. FIG. 5 shows a specific procedure which is carried out in the skip mode when an alarm is raised. Referring to FIG. 5, the spin coater SC raises an alarm. The controller 50 continues the processing of the wafers under processing that are located on the transport path in and after the spin coater SC (i.e., the n-th, (n−1)-st, and (n−2)-nd wafers) and returns these wafers to the indexer IND. However, the controller 50, on the other hands provides for the completion of the processing of the other wafers that are located in the transport path before the spin coater SC (i.e., the (n+1)-st and (n+2)-nd wafers), and then holds these wafers at their stand-by positions.

FIG. 6 is a table showing the flow of wafers when an alarm switches the processing mode to a skip mode. The left hand column in FIG. 6 shows the processing cycle. One cycle represents the time period during which each wafer is processed in a certain processing unit and conveyed to a next processing unit. The symbols shown in the top row, such as IND, HP1, and CP1 represent the respective processing units. The symbols, such as n−1, written in the columns denote the ordinal numbers of wafers, and the symbol x indicates that no wafer is present in the processing unit.

The processing cycle m in FIG. 6 corresponds to the flow shown in FIG. 3 discussed above, whereas the processing cycle (m+3) corresponds to the flow shown in FIG. 5. When the spin coater SC raises an alarm in the processing cycle (m+3), the (n+3)-rd wafer locating in the indexer IND is returned to the cassette 20, while the (n+2)-nd and (n+1)-st wafers stand by in the respective processing units. This procedure is shown in the processing cycles (m+4) through (m+6). The wafers located in the spin coater SC and the subsequent processing units are successively processed and returned to the indexer IND in the processing cycles (m+4) through (m+6). Consequently, no wafers exist on the transport path after the spin coater SC raising an alarm before the alarm is canceled in the processing cycle (m+7), and the operation of the whole semiconductor wafer processing apparatus is suspended under such a condition. When the alarm is canceled in the processing cycle (m+7); processing is resumed from the state interrupted in the skip mode as shown in FIG. 6.

Wafers located on any of the paths P1 through P6 between the respective processing units at the time of an alarm-raising are transferred at least to the subsequent processing units. By way of example, when the spin coater SC raises an alarm, the wafers existing on the paths P1 through P3 (before the spin coater SC) are respectively transferred to the subsequent processing units HP1, CP1, and SC to stand by therein. The wafers existing on the paths P4 through P6 (after the spin coater SC) are still subjected to processing and conveyance and are eventually returned to the indexer IND.

According to some processing programs or in some other substrate processing apparatus, a plurality of equivalent processing units may be arranged in parallel on the transport path. For example, the hot plate HP1 in FIG. 5 may be replaced by a plurality of hot plates arranged in parallel. When one of the plurality of equivalent processing units arranged in parallel raises an alarm, the processing and conveyance are continued until they are complete for the wafers existing in the other equivalent processing units equivalent to the alarm-raising processing unit.

In the above first embodiment, the wafers located on the transport path in and after the alarm-raising processing unit are continuously processed to the end, while those existing on the transport path before the alarm-raising processing unit are held at the respective stand-by positions. The wafers existing on the transport path in and after the alarm-raising processing unit are accordingly subjected to the processing in the substantially normal manner. This enables the required processing to be completed for the wafers existing in the transport path in and after the alarm-raising processing unit without having any adverse effects on the wafers under processing such as over-baking.

In the indexer feeding-out suspension mode described above, an alarm must be raised within a sufficient margin that enables all the wafers under processing at the time of alarm-raising to be processed completely. However, in the skip mode, a sufficient margin is required to enable the processing of the wafers which exist in the transport path on and after the alarm-raising processing unit to be completed. This means that the skip mode requires a smaller amount of margin in the alarm-raising, thereby improving the efficiency of the whole apparatus.

In the above first embodiment, the user can select either the skip mode or the index feeding-out suspension mode, which mode is triggered by an alarm (shown in FIG. 4). This effectively improves the operation efficiency of the semiconductor wafer processing apparatus by selecting either one of the two processing modes according to the preset processing program.

In the skip mode of the above first embodiment, the wafers existing in the transport path in and after the "alarm-raising processing unit" are continuously subjected to the processing to the end. Alternatively, the wafer processing may be continued for the wafers existing on the transport path in and after a specific processing unit (or "skip-mode subject unit") at the time of an alarm-raising. By way of example, it is assumed that the spin coater SC is selected as the skip-mode subject unit. Irrespective of the alarm-raising processing unite the processing can be continued only for the wafers existing on the transport path in and after the spin coater SC, i.e., the skip-mode subject unit. When an extremely expensive chemical solution (such as polyimide) is used in the spin coater SC, the economic efficiency is drastically lowered when the wafers processed in the spin coater SC are defective. However, in the present invention the processing can be completed for the wafers on which the chemical solution has already been applied in the spin coater SC at the time of an alarm-raising, thereby preventing waste of the expensive chemical solution.

B. Second Embodiment

Figure 7:
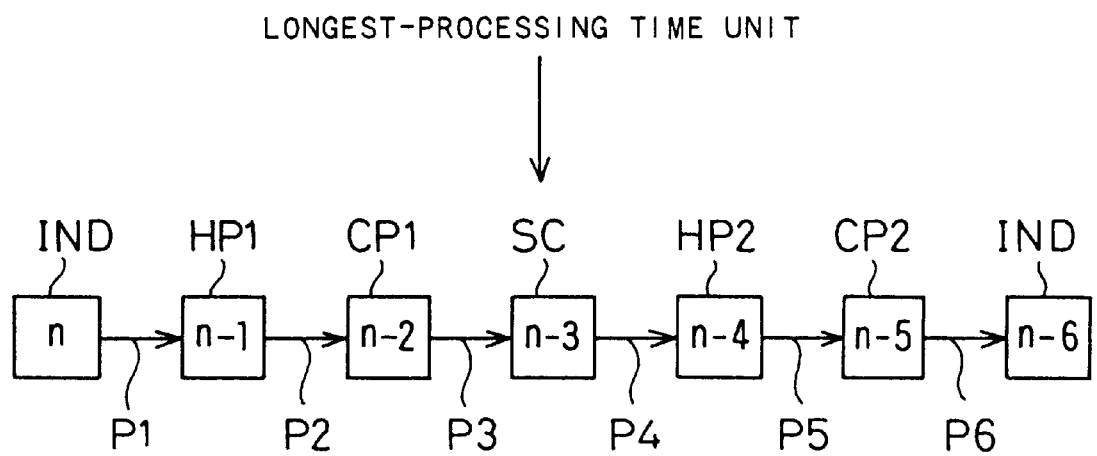
FIG. 7 shows an example of a transport path for semiconductor wafers W in the semiconductor wafer processing apparatus in a second embodiment of the present invention.

FIG. 7 shows a transport path of semiconductor wafers in a second embodiment of the present invention. The transport path shown in FIG. 7 is registered in a processing program previously set by the user. When the semiconductor wafer processing apparatus works under normal conditions, the wafers are successively processed according to the transport path shown in FIG. 7. In this second embodiment, it is assumed that the spin coater SC is the longest-processing time unit.

When the time period required for conveying a wafer on each path is 8 seconds, the total time period required for one cycle of conveyance via paths P1 to P6 using the conveyance robot 10 (hereinafter referred to as 'total conveyance time') is equal to 48 seconds. When the required processing time in the longest-processing time unit among the processing units HP1, CP1, SC, HP2, and CP2 is longer than the total conveyance times the conveyance robot 10 has to wait for a conveyance waiting time.

Figure 8:
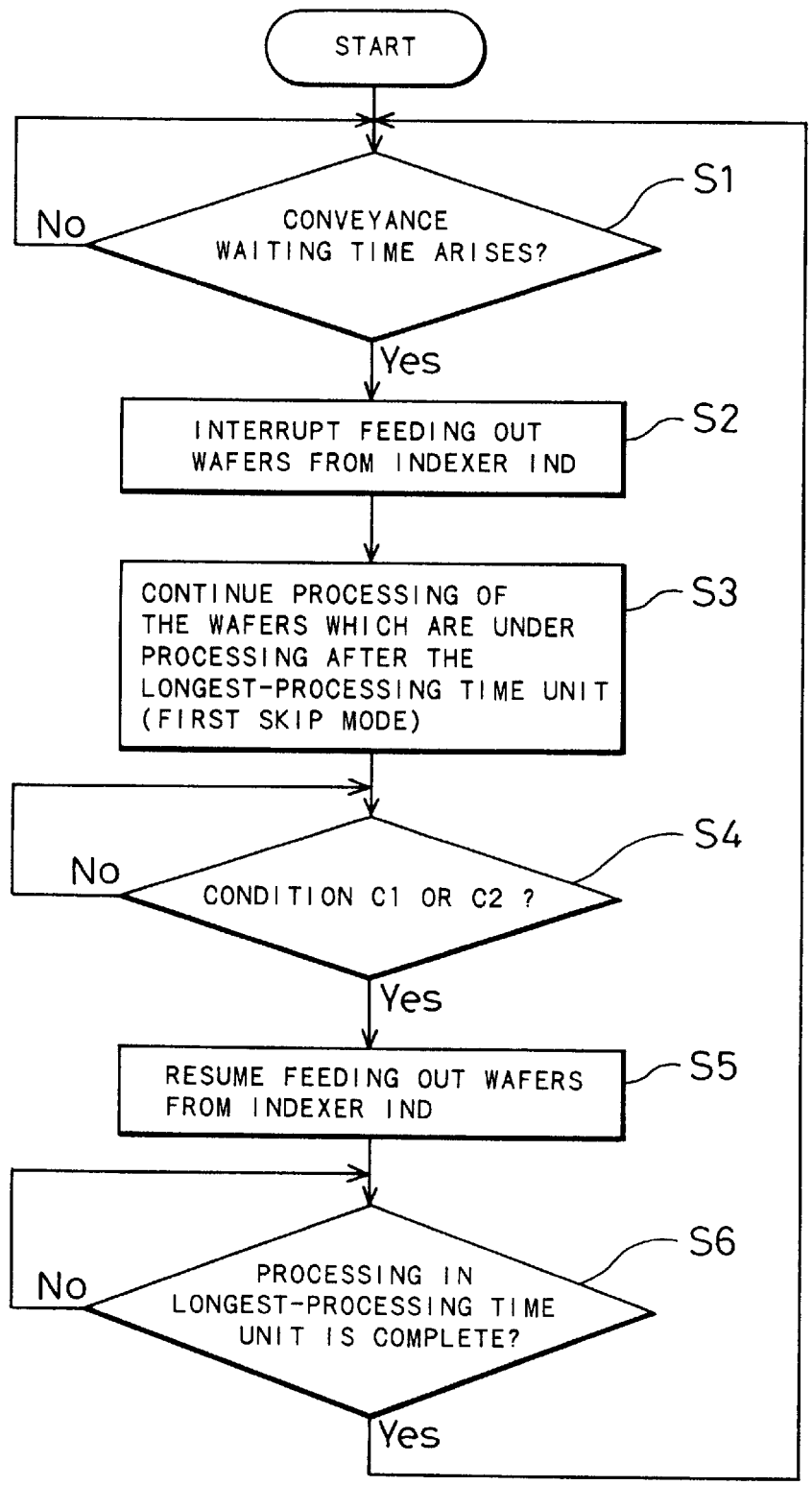
FIG. 8 is a flowchart showing a control routine executed in the second embodiment of the present invention.

FIG. 8 is a flowchart showing a control routine which is executed when a conveyance waiting time arises. When the program enters the routines the controller 50 determines whether or not a conveyance waiting time arises at step S1. By way of examples the controller 50 determines the existence of a conveyance waiting time when a semiconductor wafer is conveyed to the spin coater SC that is the longest-processing time unit, and the time period required for completion of the processing (hereinafter referred to as 'residual processing time') is longer than the total conveyance time (48 seconds) by the conveyance robot 10.

At step S2, further the transfer of wafers from the indexer IND is prohibited. This results in interrupting the operation of newly transferring wafers from the indexer IND to the conveyance robot 10.

The program then proceeds to step S3 where the controller 50 continues the processing and conveyance of the wafers under processing that are located on the transport path after the longest-processing time unit (i.e., the spin coater SC). As for the wafers under processing that are located on the transport path before the longest-processing time unit, the controller 50 suspends the conveyance after the completion of the processing in the respective processing units and holds such wafers at the respective stand-by positions of the processing units. The processing mode at step S3 is hereinafter referred to as 'first skip mode'. In the example of FIG. 7, the controller 50 continues the processing and conveyance of the wafers under processing that are located after the spin coater SC (i.e., the (n–5)-th and (n–4)-th wafers) and returns these wafers to the indexer IND. However, the controller 50 completes the processing of the wafers under processing that are located on the transport path before the spin coater SC (i.e., the (n–2)-nd and (n–1)-st wafers) and holds these wafers at their stand-by positions after completion of the processing in the respective processing units.

FIG. 9 is a table showing a flow of wafers when the presence of a conveyance waiting time activates the first skip mode. The left-hand column in FIG. 9 shows processing cycles. One cycle represents the time period during which each wafer is processed in a certain processing unit and conveyed to the next processing unit. The symbols in the top row, such as IND, HP1 and CP1 represent the respective processing units. The numerals written in the columns denote the ordinal numbers of wafers, and the symbol x indicates that no wafer is present.

When the first wafer reaches the spin coater SC, i.e., the longest-processing time unit, in processing cycle 4, a conveyance waiting time arises. The first skip mode is then carried out to enable the wafers existing in the processing units HP1 and CP1, located before the spin coater SC, to be held at the respective stand-by positions after completion of their processing in the respective processing units. At cycle 4, no wafers under processing exist in either of the processing units HP2 and CP2 located after the spin coater SC.

During the operation in the first skip mode (step S3), no new wafers are fed out from the indexer IND. The transfer of wafers from the indexer IND is resumed at step S5 only when either one of conditions C1 and C2 given below is satisfied at step S4:

Condition C1: $RPT \leq WT+TCT$ where RPT denotes Residual Processing Time in the longest-processing time unit, WT denotes Working Time of the indexer, and TCT denotes Total Conveyance Time on the paths between the indexer and the longest-processing time unit.

The Working Time of the indexer represents the time period which the indexer IND requires to take one wafer out of the cassette 20 and transfer the wafer to the transport robot 10. The Total Conveyance Time on the paths between the indexer and the longest-processing time unit corresponds to the total of conveyance time on the three paths P1 to P3 in the example of FIG. 7 and is equal to 24 seconds.

Condition C2: When a wafer that was present in a processing unit subsequent to the longest-processing time unit on the transport path has been transferred to the last processing unit.

In the example of FIG. 7, the processing unit subsequent to the longest-processing time unit is the second hot plate HP2, and the last processing unit is the second cool plate CP2.

The right hand side of the inequality of the first condition C1 given above represents the shortest possible time period required for shifting the conveyance robot 10 from the position of the indexer IND to the longest-processing time unit (hereinafter referred to as 'shortest reaching time'). When the first condition C1 is fulfilled, i.e., when the residual processing time in the longest-processing time unit is no greater than the shortest reaching time, it is considered that the net conveyance waiting time is equal to zero. Thus, the feeding-out of wafers from the indexer IND is resumed at step S5. This enables wafers to be transferred immediately from the indexer IND to the conveyance robot 10 at the moment when the processing in the longest-processing time unit is completed, thereby preventing time from being wasted.

When the second condition C2 is fulfilled, it is expected that the wafer will soon be returned from the last processing unit to the indexer IND. When the second condition C2 is satisfied, the processing at step S5 enables the indexer IND to immediately replace the wafer returned to the indexer IND with a new wafer, thereby preventing time from being wasted.

In the processing cycle 4 of FIG. 9, since no wafers exist in either of the processing units HP2 and SP2, located after the spin coater SC, the second condition C2 given above is satisfied. The transfer of wafers from the indexer IND is thus not interrupted in the processing cycle 4.

When it is determined that the processing in the longest-processing time unit has been completed (i.e., step S6 in the flowchart of FIG. 8) the conveyance of wafers is resumed and the program returns to step S1. For examples when the processing cycle 4 shown in FIG. 9 has been concluded, the first wafer is conveyed from the spin coater SC to the second hot plate HP2 whereas the wafers held at the respective stand-by positions in the processing units before the spin coater SC are transferred to the subsequent processing units. When the spin coater SC, i.e., the longest-processing time unit, starts the processing of the second wafer in the processing cycle 5, a conveyance waiting time arises and steps S2 and S3 in the flowchart of FIG. 8 are again carried out. Thus, the first wafer is in the processing unit subsequent to the spin coater SC (i.e., the second hot plate HP2) and the processing and conveyance of the first wafer are continued at step S3. In the processing cycles 5 to 7 of FIG. 9, the first skip mode is executed to successively convey only the first wafer.

When the spin coater SC or the longest-processing time unit has completed the processing of the second wafer in processing cycle 7 of FIG. 9, the wafers existing on the transport path before the spin coater SC are respectively conveyed to the subsequent processing units. When the spin coater SC or the longest-processing time unit starts the processing of the third wafer in the processing cycle 8, a conveyance waiting time arises and steps S2 and S3 in the flowchart of FIG. 8 are carried out again.

In the first skip mode, when the spin coater SC or the longest-processing time unit starts the processing of a wafer, the processing and conveyance are continued for the wafers existing on the transport path after the spin coater SC, whereas the conveyance is suspended for the wafers existing on the transport path before the spin coater SC. This readily completes the required processing for the wafers which exist on the transport path after the longest-processing time unit without having any adverse effects on the wafers under processing, such as over-baking.

In the example of FIG. 9, the processing and conveyance of the wafers located on the transport path after the spin coater SC are completed before the spin coater SC or the longest-processing of the wafer located therein time unit completes the processing. In some processing programs, however, the spin coater SC or the longest-processing time unit may complete the processing of the wafer located therein before the processing and conveyance of the wafers existing on the transport path after the spin coater SC are completed.

When the processing and conveyance of the wafers existing on the transport path after the spin coater SC have been completed before the spin coater SC or the longest-processing time unit completes the processing of the wafer located therein, as in the example of FIG. 9, the first condition C1, given above, becomes unnecessary. When only the second condition C2 is used at step S4 in the flowchart of FIG. 8 to determine that the transfer of wafers from the indexer IND is to be resumed the fifth wafer would not stand by in the indexer IND in processing cycles 5 and 6 shown in FIG. 9.

When the spin coater SC or the longest-processing time unit has completed the processing of the wafer located therein before the completion of the processing and conveyance of the wafers existing on the transport path after the spin coater SC, the second condition C2 becomes unnecessary. In accordance with another possible application, the user may select either one of the two conditions C1 and C2 according to the processing program and use the selected condition for the judgement.

C. Third Embodiment

FIG. 10 is a flowchart showing a control routine which is executed in a third embodiment according to the present invention. The flowchart of FIG. 10 includes steps S11 through S13 interposed between steps S3 and S4 in the flowchart of the second embodiment shown in FIG. 8. As specified at step S11, the procedure of FIG. 10 is carried out when one of the processing units raises an alarm during the operation in the first skip mode.

When each processing unit detects some abnormality, the processing unit raises an alarm and informs the controller 50 of the occurrence of the abnormality. The alarm is raised, for example, when the volume of a chemical solution in the spin coater SC is insufficient or when an abnormal temperature is detected in the hot plate HP1 or HP2. The controller 50 then raises an alarm to inform the user of the occurrence of the abnormality at step S11 and executes the required control sequence in response to the alarm at steps S12 and S13.

A second skip mode occurs at step S12 in the flowchart of FIG. 10 requires that the controller 50 continue the processing and conveyance of the wafers under processing that are located on the transport path in and after the processing unit raising the alarm (hereinafter referred to as 'alarm-raising processing unit'). As for the wafers under processing that are located on the transport path before the alarm-raising processing unit, the controller 50 suspends the conveyance after completion of the processing in the respective processing units and holds such wafers at the respective stand-by positions of the processing units.

Wafers existing on any of the paths P1 through P6 between the respective processing units at the time of alarm-raising are transferred at least to the subsequent processing units.

According to some processing programs or in some substrate processing apparatus, a plurality of equivalent processing units may be arranged in parallel on the transport path. For example, the hot plate HP1 in FIG. 7 may be replaced by a plurality of hot plates arranged in parallel. When one among the plurality of equivalent processing units arranged in parallel raises an alarm, processing is continued until complete for the wafers which exist in the other equivalent processing units equivalent to the alarm-raising processing unit.

Figure 11A:
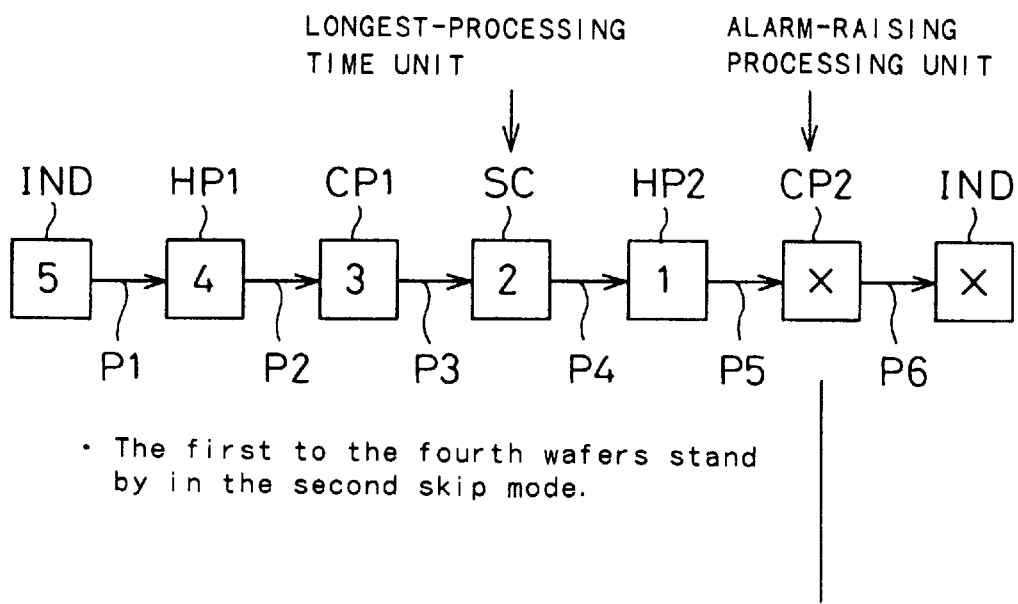
FIGS. 11A and 11B show a specific procedure which is carried out in the multiple skip modes in the third embodiment.
Figure 11B:
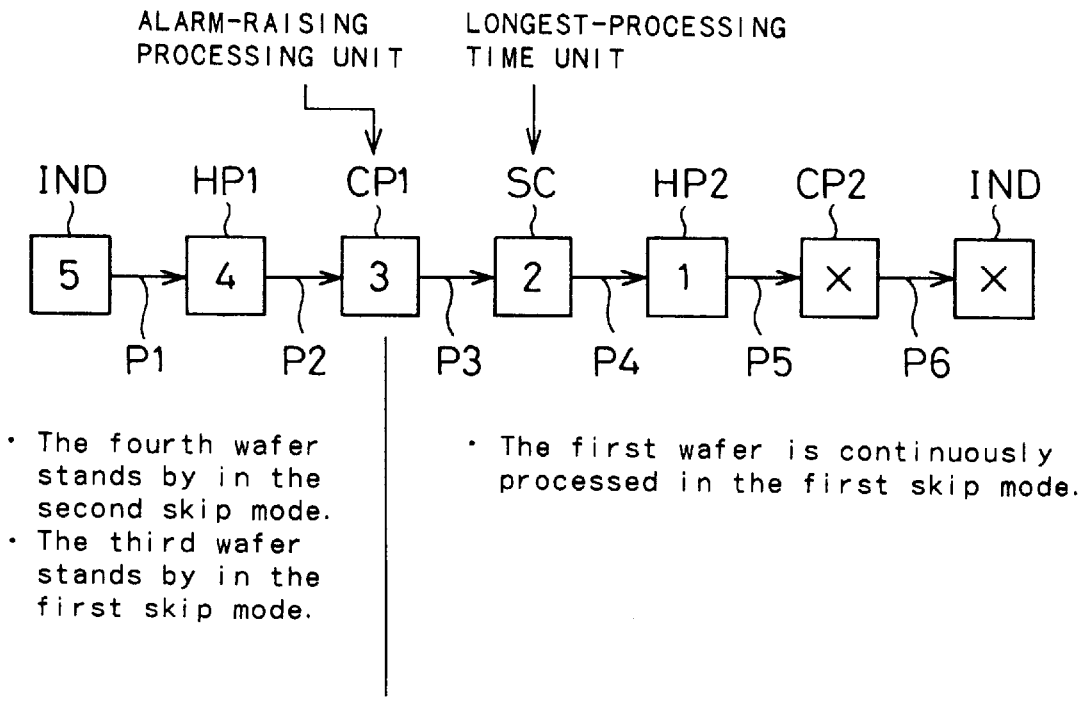

FIGS. 11A and 11B show a specific procedure when the second skip mode is activated by an alarm during the operation in the first skip mode. In the example of FIG. 11A, a processing unit (the second cool plate CP2) located after the spin coater SC, or the longest-processing time unit, raises an alarm in processing cycle 5 of FIG. 9. When the alarm-raising processing unit is located after the longest-processing time unit, as in this example, the wafers existing on the transport path before the alarm-raising processing unit stand by in the second skip mode.

In the example of FIG. 11B, a processing unit (the first cool plate CP1) located before the spin coater SC, or the longest-processing time unit, raises an alarm in processing cycle 5 of FIG. 9. When the alarm-raising processing unit is located before the longest-processing time unit, the wafers existing on the transport path before the alarm-raising processing unit (the fourth wafer existing in the first hot plate HP1 in the example of FIG. 11B) stand by in the second skip mode. In the meantime, the wafers existing on the transport path in and after the alarm-raising processing unit and before the longest-processing time unit (the third wafer existing in the first cool plate CP1 in the example of FIG. 11B) stand by in the first skip mode. The processing and conveyance are continued in the first skip mode for the wafers existing on the transport path after both the alarm-raising processing unit and the longest-processing time unit.

When an alarm is raised during the operation in the first skip mode, both the first skip mode and the second skip mode are carried out. As clearly understood from the above description, the second skip mode takes priority over the first skip mode. When the alarm is canceled at step S13 in the flowchart of FIG. 10, processing is resumed from the interrupted state in the second skip mode.

In the third embodiment, when an alarm is raised during the operation in the first skip mode, the second skip mode is executed to continue the processing and conveyance of the wafers existing on the transport path in and after the alarm-raising processing unit. This readily completes the required processing for the wafers existing on the transport path in and after the alarm-raising processing unit without having any adverse effects on the wafers under processing, such as over-baking.

Although the present invention has been described and illustrated in detail, it is clearly understood that the same is by way of illustration and example only and is not to be taken as limiting. The spirit and scope of the present invention should be limited only by the appended claims.

What is claimed is:

1. A method of controlling a substrate processing apparatus, which apparatus successively conveys substrates to a plurality of processing units via a preset transport path and processes the substrates thus conveyed, said method comprising the step of:

executing a control sequence in a skip mode when one of said plurality of processing units raises an alarm to indicate the occurrence of an abnormality, said skip mode control continuing and completing the processing and conveyance of each substrate located on said transport path in and after said alarm-raising processing unit, while completing the processing of any substrate in a particular processing unit located on said transport path before said alarm-raising processing unit but suspending the conveyance of those substrates into subsequent processing units.

2. The method in accordance with claim 1, said method further comprising the steps of:

selecting one of said skip mode and a processing complete mode;

executing the control sequence in the skip mode when such mode is selected; and executing the control sequence in the processing complete mode when such mode is selected and when one of said plurality of processing units raises an alarm to indicate the occurrence of an abnormality, said processing complete mode comprising the steps of:
preventing new substrates from being introduced into the process;
continuing and completing the processing and conveyance of each substrate already in the process; and
halting the process when all of the substrates already in the process have completed their processing.

3. A method of controlling a substrate processing apparatus, which apparatus successively conveys substrates to a plurality of processing units via a preset transport path and processes the substrates thus conveyed, said method comprising the steps of:

selecting at least one of said plurality of processing units as a skip-mode subject unit; and executing a control sequence in a skip mode when one of said plurality of processing units raises an alarm to indicate the occurrence of an abnormality, said skip mode continuing and completing the processing and conveyance of for each substrate located in said transport path in and after said skip-mode subject unit, while completing the processing of any substrate in a particular processing unit located on said transport path before said skip-mode subject unit but suspending the conveyance of those substrates into subsequent processing units.

4. The method in accordance with claim 3, said method further comprising the steps of:

selecting one of said skip mode and a processing complete mode;

executing the control sequence in the skip mode when such mode is selected; and executing the control sequence in the processing complete mode when such mode is selected and when one of said plurality of processing units raises an alarm to indicate the occurrence of an abnormality, said processing complete mode comprising the steps of:
preventing new substrates from being introduced into the process;
continuing and completing the processing and conveyance of each substrate already in the process; and
halting the process when all of the substrates already in the process have completed their processing.

5. The method in accordance with claim 3, wherein said skip-mode subject unit comprises a coating unit for coating a layer of chemical material on a substrate.

6. A method of controlling a substrate processing apparatus, which apparatus successively conveys substrates from a starting unit to a plurality of processing units via a preset transport path and processes the substrates thus conveyed, said method comprising the step of:

executing a control sequence in a first skip mode when a waiting time arises before transferring a substrate to a longest-processing time unit, which unit has the longest processing time for processing a substrate among said plurality of processing units, said waiting time arising when the longest processing time is greater than an aggregate time to convey a substrate along said transport path from said start unit through said plurality of processing units, said first skip mode continuing and completing the processing and conveyance of each substrate located on said transport path after said longest-processing time unit while suspending the conveyance for each substrate located on said transport path before said longest-processing time unit.

7. The method in accordance with claim 6, said method further comprising the step of:

executing a control sequence in a second skip mode when one of said plurality of processing units raises an alarm to indicate the occurrence of an abnormality while said first skip mode is being executed, said second skip mode continuing and completing the processing and conveyance of each substrate existing on said transport path in and after said alarm-raising processing unit while completing the processing of any substrate in a particular processing unit located on said transport path before said alarm-raising processing unit but suspending the conveyance of those substrates into subsequent processing units.

8. The method in accordance with claim 6, said method further comprising the steps of:

selecting at least one of said plurality of processing units as a skip-mode subject unit; and executing a control sequence in a second skip mode when one of said plurality of processing units raises an alarm to indicate the occurrence of an abnormality while said first skip mode is being executed, said second skip mode continuing and completing the processing and conveyance of each substrate located on said transport path in and after said skip-mode subject unit while completing the processing of any substrate in a particular processing unit located on said transport path before said skip-mode subject unit but suspending the conveyance of those substrates into subsequent processing units.

9. A controlling apparatus for controlling a substrate processing apparatus, which substrate processing apparatus successively conveys substrates via a preset transport path and processes the substrates thus conveyed, said controlling apparatus comprising:

a plurality of processing units; and a system for executing a control sequence in a skip mode when one of said plurality of processing units raises an alarm to indicate the occurrence of an abnormality, said skip mode continuing and completing the processing and conveyance of for each substrate located on said transport path in and after said alarm-raising processing unit while completing the processing of any substrate in a particular processing unit located on said transport path before said alarm-raising processing unit but suspending the conveyance of those substrates into subsequent processing units.

10. The controlling apparatus in accordance with claim 9, said controlling apparatus further comprising:

a system for (i) selecting one of said skip mode and a processing complete mode; (ii) executing the control sequence in the skip mode when such mode is selected; and (iii) executing the control sequence in the processing complete mode when such mode is selected and when one of said plurality of processing units raises an alarm to indicate the occurrence of an abnormality, said processing complete mode: (i) preventing new substrates from being introduced into the process; (ii) continuing and completing the processing and conveyance of each *substrate already in the process; and (iii) halting the process when all of the substrates already in the process have completed their processing.

11. A controlling apparatus for controlling a substrate processing apparatus, which substrate processing apparatus successively conveys substrates via a preset transport path and processes the substrates thus conveyed, said controlling apparatus comprising:

a system for selecting at least one of said plurality of processing units as a skip-mode subject unit; and a system for executing a control sequence in a skip mode when one of said plurality of processing units raises an alarm to indicate the occurrence of an abnormality, said skip mode continuing and completing the processing and conveyance of each substrate located on said transport path in and after said skip-mode subject unit while completing the processing of any substrate in a particular processing unit located on said transport path before said skip-mode subject unit but suspending the conveyance of those substrates into subsequent processing units.

12. The controlling apparatus in accordance with claim 11, said controlling apparatus further comprising:

a system for (i) selecting one of said skip mode and a processing complete mode: (ii) executing the control sequence in the skip mode when such mode is selected; and (iii) executing the control sequence in the processing complete mode when such mode is selected and when one of said plurality of processing units raises an alarm to indicate the occurrence of an abnormality, said processing complete mode: (i) preventing new substrates from being introduced into the process; (ii) continuing and completing the processing and conveyance of each *substrate already in the process; and (iii) halting the process when all of the substrates already in the process have completed their processing.

13. The controlling apparatus in accordance with claim 11, wherein said skip-mode subject unit comprises a coating unit for coating a layer of chemical material on a substrate.

14. A controlling apparatus for controlling a substrate processing apparatus, which substrate processing apparatus successively conveys substrates from a starting unit to a plurality of processing units via a preset transport path and processes the substrates thus conveyed, said controlling apparatus comprising:

a system for executing a control sequence in a first skip mode when a waiting time arises before transferring a substrate to a longest-processing time unit, which unit has the longest processing time for processing a substrate among said plurality of processing units, said waiting time arising when the longest processing time is greater than an aggregate time to convey a substrate along said transport path from said start unit through said plurality of processing units, said first skip mode continuing and completing the processing and conveyance of each substrate located on said transport path after said longest-processing time unit while suspending the conveyance for each substrate located on said transport path before said longest-processing time unit.

15. The controlling apparatus in accordance with claim 14, said controlling apparatus further comprising:

a system for executing a control sequence in a second skip mode when one of said plurality of processing units raises an alarm to indicate the occurrence of an abnormality while said first skip mode is being executed, said second skip mode continuing and completing the processing and conveyance of each substrate located on said transport path in and after said alarm-raising processing unit while completing the processing of any substrate in a particular processing unit located on said transport path before said alarm-raising processing unit but suspending the conveyance of those substrates into subsequent processing units.

16. The controlling apparatus in accordance with claim 14, said controlling apparatus further comprising:

a system for selecting at least one of said plurality of processing units as a skip-mode subject unit; and a system for executing a control sequence in a second skip mode when one of said plurality of processing units raises an alarm to indicate the occurrence of an abnormality while said first skip mode is being executed, said second skip mode continuing and completing the processing and conveyance of each substrate located on said transport path in and after said skip-mode subject unit while completing the processing of any substrate in a particular processing unit located on said transport path before said skip-mode subject unit but suspending the conveyance of those substrates into subsequent processing units.

* * * * *